United States Patent
Kostic et al.

(10) Patent No.: US 10,404,624 B2
(45) Date of Patent: Sep. 3, 2019

(54) LOSSLESS SWITCHING OF TRAFFIC IN A NETWORK DEVICE

(71) Applicant: BROADCOM CORPORATION, Irvine, CA (US)

(72) Inventors: Predrag Kostic, Burnaby (CA); Darren Duane Neuman, Palo Alto, CA (US); David Wu, San Diego, CA (US); Anand Tongle, San Diego, CA (US); Rajesh Shankarrao Mamidwar, San Diego, CA (US); Milomir Aleksic, Vancouver (CA)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 894 days.

(21) Appl. No.: 14/072,745

(22) Filed: Nov. 5, 2013

(65) Prior Publication Data

US 2015/0081865 A1 Mar. 19, 2015

Related U.S. Application Data

(60) Provisional application No. 61/879,094, filed on Sep. 17, 2013.

(51) Int. Cl.
*G06F 15/173* (2006.01)
*H04L 12/931* (2013.01)

(52) U.S. Cl.
CPC .................... *H04L 49/505* (2013.01)

(58) Field of Classification Search
CPC ............. H04L 12/5693; H04L 47/14; H04L 47/19–20; H04L 47/22; H04L 47/29–30; H04L 47/32; H04L 47/56; H04L 47/101; H04L 47/215; H04L 47/824; H04L 47/2433; H04L 47/2441; H04L 47/6215
USPC ........ 709/217, 223, 234; 370/229, 230, 237, 370/288, 412
See application file for complete search history.

(56) References Cited

U.S. PATENT DOCUMENTS

| 8,638,784 | B1 * | 1/2014 | Walsh | H04L 47/10 370/363 |
| 8,782,307 | B1 * | 7/2014 | White | G06F 5/14 709/235 |
| 9,929,829 | B1 * | 3/2018 | Huang | H04L 1/00 |

(Continued)

*Primary Examiner* — Farzana B Huq
(74) *Attorney, Agent, or Firm* — Morgan, Lewis & Bockius LLP

(57) ABSTRACT

A system for lossless switching of traffic in a network device may be implemented when a network switch is integrated into a gateway device, or with any other data source. A processor of the gateway device may receive queue depth information for queues of the network switch. The processor may prevent data from being transmitted to congested queues of the network switch, while allowing data to be transmitted to uncongested queues. In this manner, data loss can be avoided through the network switch for data sourced from the gateway device, such as audio-video data retrieved from a hard drive, audio-video data received from a tuner, etc. Furthermore, re-transmission at higher layers can be reduced. Since the subject system observes congestion for each individual queue, only traffic destined to that particular, congested, queue is affected, e.g. paused. Traffic to non-congested queues is not affected, regardless of traffic class or egress port.

20 Claims, 9 Drawing Sheets

(56) References Cited

U.S. PATENT DOCUMENTS

| | | | |
|---|---|---|---|
| 2007/0121499 A1* | 5/2007 | Pal | H04L 45/60 370/230 |
| 2007/0217336 A1* | 9/2007 | Sterne | H04L 47/10 370/235 |
| 2008/0159749 A1* | 7/2008 | Imoto | H04B 10/2537 398/159 |
| 2013/0028080 A1* | 1/2013 | Rao | H04L 47/6215 370/230 |
| 2013/0279340 A1* | 10/2013 | Nakash | H04L 47/2483 370/237 |
| 2013/0322236 A1* | 12/2013 | Bahadur | H04L 12/4633 370/230 |

* cited by examiner

LOSSLESS SWITCHING OF TRAFFIC IN A NETWORK DEVICE

CROSS-REFERENCE TO RELATED APPLICATIONS

The present application claims the benefit of U.S. Provisional Patent Application Ser. No. 61/879,094, entitled "Management of Data Flows to a Switch Device," filed on Sep. 17, 2013, which is hereby incorporated by reference in its entirety for all purposes.

TECHNICAL FIELD

The present description relates generally to switching of traffic in a network device, in particular, relates to lossless switching of traffic in a network device.

BACKGROUND

In switch devices, data received by a switch device over a port is queued in a queue of a buffer associated with the switch device. From these queues, the data may be routed to an intended destination device. However, if the queues are congested, the data may be dropped. In such a situation, the data may be retransmitted by the source device to the destination device (e.g., according to transmission control protocol/internet protocol (TCP/IP)). The data may continue to be dropped at the switch device if the queues remain congested, and therefore the data may repeatedly be retransmitted until space in the buffer associated with the switch becomes available. However, repeatedly dropping and retransmitting data may reduce channel efficiency and degrade user experience.

Switch devices (and other network devices) may attempt to alleviate dropped packets by utilizing backpressure mechanisms, e.g. PAUSE frames (e.g., as defined in IEEE 802.3 specification) or, priority based flow control (PFC) frames (e.g., as defined in IEEE 802.1Qbb). However, when the (802.3) PAUSE mechanism is deployed all traffic from the device sourcing traffic may be in backpressure, even when only a single switch egress queue is in backpressure. The PFC mechanism enables per traffic class backpressure; however, when a single queue on the particular egress port of the particular traffic class is in backpressure the source device cannot send traffic to any other switch port queue that is of the same traffic class.

Furthermore, when PAUSE or PFC mechanisms are deployed, in order to guarantee lossless behavior at least two times the maximum transmission unit (MTU) for the particular network must be reserved in the buffer on a per port and/or per queue basis, in addition to the buffer space required for the regular network traffic. This may lead to inefficient switch packet buffer utilization when the reserved buffer overhead cannot be used by queues having heavy traffic, which may eventually result in dropped packets.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
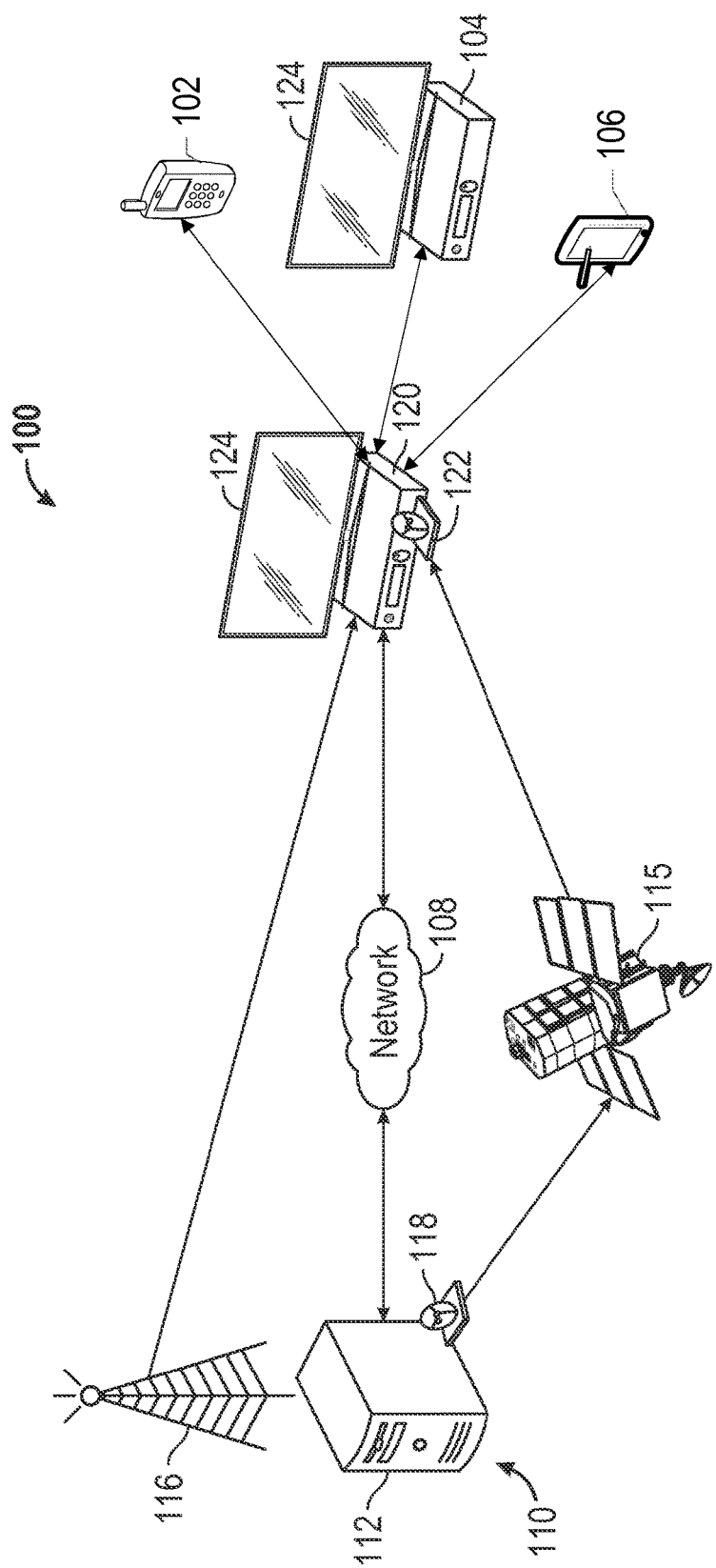
FIG. 1 illustrates an example network environment in which a system for lossless switching of traffic in a network device may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system provides for lossless switching of traffic in a network device that includes a processor and a collocated switch device such that data loss and/or data retransmission through the switch device is substantially minimized and/or eliminated. In one or more implementations, each data channel handled by the processor may be associated with one of the queues of the switch device. The processor may receive congestion information for each of the queues of the switch device and may prevent data channels associated with congested queues from releasing data to the switch device while allowing data channels associated with uncongested queues to release data to the switch device. In this manner, the processor prevents data from being released to congested queues of the switch device, and thus prevents data from being dropped at the switch device, thereby providing for lossless switching of traffic through the network device.

An example system in which lossless switching of traffic may be provided is a network device that includes a dedicated processor along with associated hardware and/or firmware that exclusively processes audio video (AV) traffic transmitted through the network device, along with a host processor that processes non-AV traffic transmitted through the network device. In one or more implementations, the dedicated processor and associated hardware and/or firmware may collectively be referred to as a stream processor. The network device may further include a switch device that routes the AV traffic to, and receives AV traffic from, the stream processor and that routes the non-AV traffic to, and receives non-AV traffic from, the host processor. Accordingly, the switch device can allocate separate queues, on a per-port basis, for the AV traffic received from the stream processor, which may be deterministic, and the non-AV traffic received from the host processor, which may be also be deterministic. In one or more implementations, the queues for the AV traffic may be given a higher priority than the queues for the non-AV traffic, and vice-versa. The switch device also may be coupled to, and/or may include, a module that notifies the stream processor of congestion status at the queues allocated for AV traffic. The stream processor may utilize the congestion status information to facilitate scheduling the release of data from the stream processor to the switch device, e.g. such that data loss and/or data retransmission through the switch device is substantially minimized and/or eliminated.

FIG. 1 illustrates an example network environment 100 in which a system for lossless switching of traffic in a network device may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to a network device 120, such as by a network 108. In one or more implementations, the example network environment 100 may further include one or more electronic devices 102, 104, 106 that are communicably coupled to the network device 120. In one or more implementations, the network device 120 may be, or may also include, a set-top box, e.g. a device that is coupled to, and is capable of presenting AV programs on, an output device 124, such as a television, a monitor, speakers, or any device capable of presenting AV programs. In one or more implementations, the network device 120 may be integrated into the output device 124.

The CDN 110 may include, and/or may be communicably coupled to, a content server 112, an antenna 116 for transmitting AV streams, such as via multiplexed bitstreams, over the air, and a satellite transmitting device 118 that transmits AV streams, such as via multiplexed bitstreams to a satellite 115. The network device 120 may include, and/or may be coupled to, a satellite receiving device 122, such as a satellite dish, that receives data streams, such as multiplexed bitstreams, from the satellite 115. In one or more implementations, the network device 120 may further include an antenna for receiving data streams, such as multiplexed bitstreams over the air from the antenna 116 of the CDN 110. In one or more implementations, the content server 112 may transmit AV streams to the network device 120 over the coaxial transmission network. In one or more implementations, the network device 120 may receive internet protocol (IP) distributed AV streams via the network 108 and native moving picture experts group (MPEG) transport streams may be received via one or more of the antenna 116 and the satellite 115. The content server 112 and/or the network device 120, may be, or may include, one or more components of the electronic system discussed below with respect to FIG. 9.

In one or more implementations, any network data transmissions that include AV streams and/or AV data, and/or are associated with AV streams and/or AV data, such as acknowledgments for AV streams, may be referred to as AV traffic (or AV network traffic). Similarly, any network data transmissions that do not include, and/or are not associated with, AV streams and/or AV data, may be referred to as non-AV traffic (or non-AV network traffic).

The electronic devices 102, 104 and 106 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for receiving, decoding, and presenting AV programs and/or can be coupled to such a device. In the example of FIG. 1, electronic device 102 is depicted as a smart phone, electronic device 104 is depicted as a set-top box, and electronic device 106 is depicted as a tablet device. In one or more implementations, any of electronic devices 102, 104, 106 may be referred to as a user device or a client device. For example, the electronic device 104 and the network device 120 may both be set-top boxes and the electronic device 104 may operate as a client device of the network device 120.

The network device 120 may include, or may be coupled to, memory, a host processor for processing non-AV traffic, and a dedicated processor, along with associated hardware/firmware, that exclusively processes AV traffic, e.g. a stream processor. The network device 120 may also include a switch device that is configurable to route non-AV traffic to the host processor and AV traffic to the stream processor. In one or more implementations, the host processor, the stream processor, and/or the switch device may be co-located, e.g. on the same semiconductor chip and/or the same integrated circuit. The switch device of the network device 120 may include separate queues, on a per-port basis, for AV traffic received from the stream processor and the non-AV traffic received from the host processor. In one or more implementations, the AV traffic may be deterministic, e.g. predictable, while the non-AV traffic may be non-deterministic, e.g. unpredictable. Thus, by providing separate queues for the AV traffic, e.g. the deterministic traffic, and managing the flow of the AV traffic from the stream processor, AV traffic loss through the switch device can be substantially minimized and/or eliminated. An example network device 120 that includes a host processor and a stream processor is discussed further below with respect to FIGS. 2, 4, 6, and 7.

In one or more implementations, the network device 120 may include a network processor and a switch device. For example, the network device may be a gateway device, such as a digital subscriber line (DSL) gateway, a cable modem gateway, or generally any gateway device. The network processor may process data items, such as data channels, data queues, data flows, data contexts, etc., that are associated with queues of the switch device. The network processor may receive congestion status for the queues of the switch device and may prevent data channels associated with congested queues from releasing additional data to the switch device, thereby preventing data loss at the switch device. An example network device 120 including a network processor is discussed further below with respect to FIGS. 3, 5, and 8.

In the example network environment 100 of FIG. 1, the network device 120 is configured to couple the electronic devices 102, 104, 106 to the content server 112 and/or to the network 108, e.g. by using the aforementioned switch device. For example, the network device 120 may receive requests for AV traffic, via the switch device, from the electronic devices 102, 104, 106 and may forward the requests, via the switch device, to the content server 112. In response to the requests, the network device 120 may receive, via the switch device, AV traffic from the content server 112 and may forward the AV traffic, via the switch device, to one or more of the electronic devices 102, 104, 106. In one or more implementations, the network device 120 may receive and/or retrieve AV streams via one or more local AV sources, such as a local hard drive and/or one or more local AV tuners. For example, the electronic devices 102, 104, 106 may record AV programs on the local hard drive of the network device 120. The network device 120 may packetize and/or otherwise process AV streams received/retrieved from local AV sources and may provide the packetized AV data to the electronic devices 102, 104, 106 for playback via the switch device.

Figure 2:
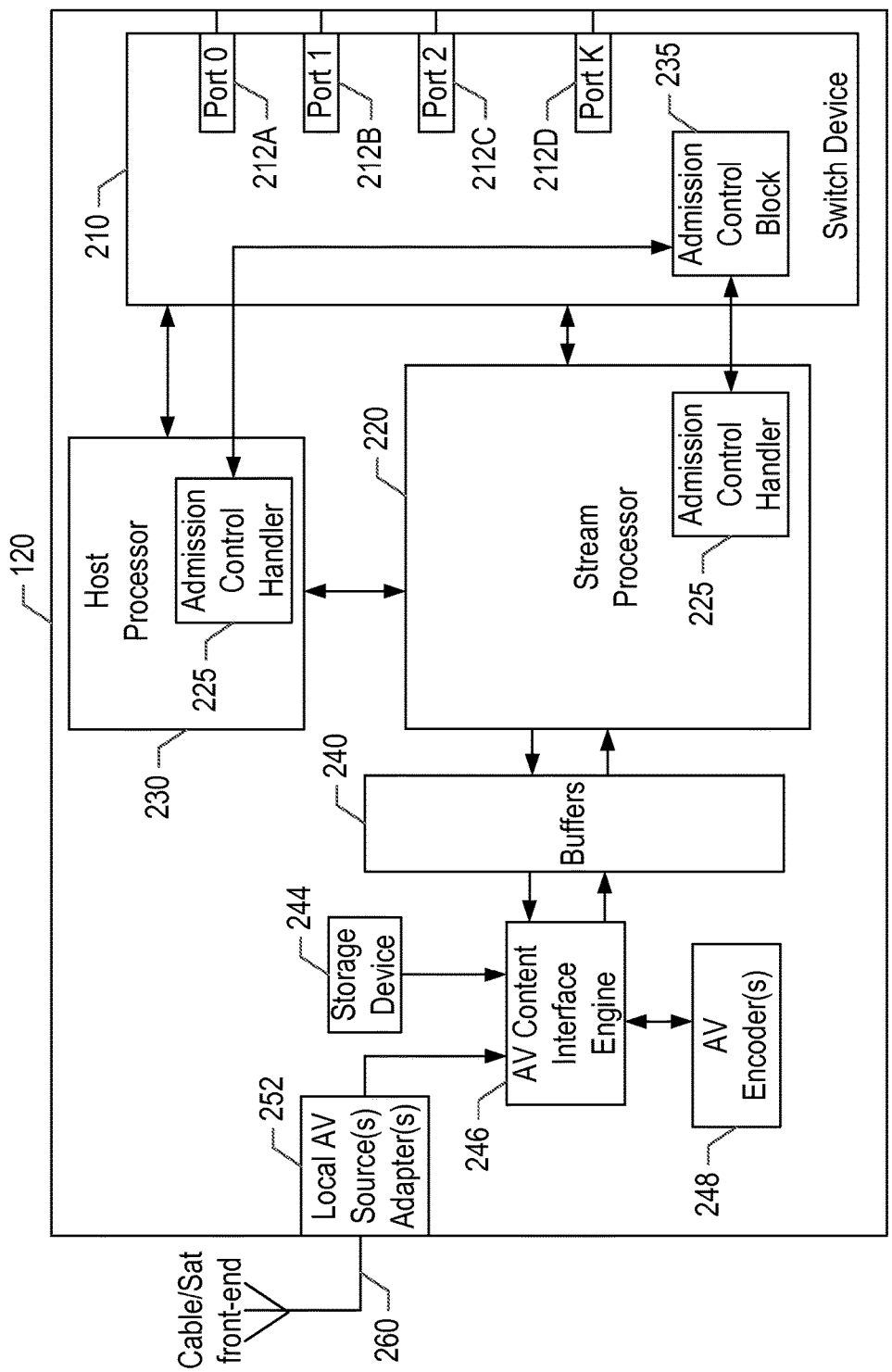
FIG. 2 illustrates an example network device including a stream processor and implementing a system for lossless switching of traffic in accordance with one or more implementations.

FIG. 2 illustrates an example network device 120 including a stream processor 220 and implementing a system for lossless switching of traffic in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network device 120 includes a switch device 210, a stream processor 220, a host processor 230, one or more buffers 240, a storage device 244, an AV content interface engine 246, one or more AV encoders 248, one or more local AV source adapters 252, and a cable/satellite front end 260. The cable/satellite front end 260 may include the satellite receiving device 122, and one or more other devices and/or connections for receiving AV content via a coaxial transmission network, via satellite, via antenna, and/or via any other transmission network. The switch device 210 may include one or more ports 212A-D that may be coupled to one or more physical network ports, such as an Ethernet port, a multimedia over coax alliance (MoCA) port, reduced gigabit media independent interface (RGMII) port, and the like.

The buffers 240 may be, or may include, one or more memory modules, such as dynamic random-access memory (DRAM), static random-access memory (SRAM), or generally any memory modules. For explanatory purposes, the buffers 240 are illustrated as a single block; however, the buffers 240 may be several separate individual buffers, or several separate partitions of one or more memory modules. Further for explanatory purposes, the buffers 240 may conceptually represent on-chip and/or off-chip memory modules. For example, the buffers 240 may conceptually represent on-chip queues of packet descriptors and off-chip memory that stores the corresponding packets. The AV encoders 248 may transcode or otherwise encode AV streams, e.g. for transmission to one or more of the electronic devices 102, 104, 106. The storage device 244 may be, or may include, a non-volatile storage medium, such as a hard drive, and may store one or more AV programs, such as AV programs received by the network device 120.

The local AV source adapters 252 may be one or more adapters configured to receive AV streams over one or more local AV connections, such as satellite, coaxial, etc. For example, the local AV source adapters 252 may include one or more tuners for receiving multiplexed bitstreams over satellite, coaxial, etc. The local AV source adapters 252 may also process received streams, such as demultiplexing multiplexed bitstreams, to access the individual AV streams and/or transport stream packets. The AV content interface engine 246 aggregates the AV streams received via the switch device 210, e.g. from the content server 112, and the AV stream received from coaxial or satellite connections, e.g. via local AV source adapters 252, and/or stored on the storage device 244. The AV content interface engine 246 then stores the transport stream packets in the buffers 240, e.g. without encryption, for transmission to the electronic devices 102, 104, 106, and/or for presentation via a local output device 124.

The stream processor 220 may include one or more processors, memory, such as on-chip memory, firmware, and one or more other modules and/or associated circuitry for processing AV traffic, such as a packetizer module, a depacketizer module, one or more security modules, and the like. The host processor 230 may be a general purpose processor of the network device 120. The host processor 230 and the stream processor 220 may be communicatively coupled to one another, for example, via a transmission line. The stream processor 220 and the host processor 230 may also include an admission control handler (ACH) 225. The ACH 225 is a module that enables the stream processor 220 and the host processor 230 to individually exchange intent to transmit messages with the switch device 210 and to obtain per switch egress queue congestion statuses from the switch device 210.

The switch device 210 may include suitable circuitry and/or logic for routing network traffic, such as AV traffic and non-AV traffic, to one or more components of the network device 120, such as the host processor 230 and/or the stream processor 220. The switch device 210 may further include an admission control block (ACB) 235 that is communicatively coupled to the ACH 225 of the stream processor 220 and the ACH 225 of the host processor 230, e.g. via transmission lines on an integrated circuit that contains both the ACB 235 and the ACHs 225. The ACB 235 is a module that calculates congestion status of each of the switch egress queues using an algorithmic function that is based at least on the switch queue depths and the intents to transmit messages received from the ACH 225 of the stream processor 220 and/or the ACH of the host processor 230.

The host processor 230 and/or the stream processor 220 may individually be associated with a port on the switch device 210. For example, the stream processor 220 may be associated with a first port and the host processor 230 may be associated with a second port that is distinct from the first port. The switch device 210 may be configured to route communications received from, and/or transmitted to, a communicably connected device, such as one or more of the electronic devices 102, 104, 106 and/or the content server 112, to either port and consequently to either of stream processor 220 or host processor 230. In one or more implementations, when the host processor 230 and/or the stream processor 220 is transmitting non-AV traffic or AV traffic, respectively, via the switch device 210, the ports of the switch device 210 that are associated with the host processor 230 and/or the stream processor 220 may be logically referred to as ingress ports, and the ports 212A-D of the switch device 210 may be logically referred to as egress ports.

Furthermore, the switch device 210 may include separate queues, on a per port basis, for AV traffic received from the stream processor 220 and non-AV traffic received from the host processor 230. The queues may be individually prioritized within the switch device 210 such that AV traffic can be prioritized separately, e.g. with a higher scheduling priority, than the non-AV traffic. Thus, congestion at the switch device 210 with respect to the non-AV traffic can be isolated from congestion at the switch device 210 with respect to AV traffic, and vice-versa. The ACB 235 may monitor the congestion at the queues of the switch device 210 with respect to AV traffic, e.g. based on queue depth of the queues for AV traffic, and may communicate the congestion information to the ACH 225, e.g. in response to a request therefor and/or as a broadcast signal on a periodic basis, such as every clock cycle.

The stream processor 220 may operate in conjunction with the other components of the network device 120 to provide AV streams to the electronic devices 102, 104, 106. For example, the AV streams received from the antenna 116 may be routed by the switch device 210 to the stream processor 220. The stream processor 220 may decrypt the AV streams, e.g. in conjunction with a security module, and store the AV streams, and/or descriptors thereof, in the buffers 240. The data units of the individual packets of the AV streams may then be scheduled, e.g. on a per stream basis, to be released to a packetization pipeline of the stream processor 220 and subsequently passed to the switch device 210 for transmission to the electronic devices 102, 104, 106. In one or more implementations, the packetization pipeline of the stream processor 220 may include one or more modules, such as an encryption module, a packetizer module, etc. In one or more implementations, the data units may be fixed or variable sized. In one or more implementations, a data unit may be any number of bytes, e.g. one or more bytes, and a packet, such as an internet protocol (IP) packet, may include one or more data units.

The scheduling of the release of data units of the AV streams to the packetization pipeline may be facilitated and/or managed by the ACH 225, e.g. based at least in part on congestion information received from the ACB 235 of the switch device 210. The ACH 225 may also receive feedback from the stream processor 220, e.g. at the end of, and/or at any point during, the packetization pipeline. In this manner, the ACH 225 can provide the ACB 235 with information regarding in-flight, or in-transit, packets that have reached, or are about to reach, the switch device 210. The ACB 235 may maintain an in-flight variable for each queue that is indicative of packets that have been released from the data source but have not reached the switch device 210. Thus, upon receiving an indication from the ACH 225 that a packet has reached, or is about to reach, the switch device 210, the ACB 235 may remove the packet from the variable. Example operations of the ACH 225 are discussed further below with respect to FIGS. 4 and 6, and example operations of the ACB 235 are discussed further below with respect to FIGS. 4 and 7.

Figure 3:
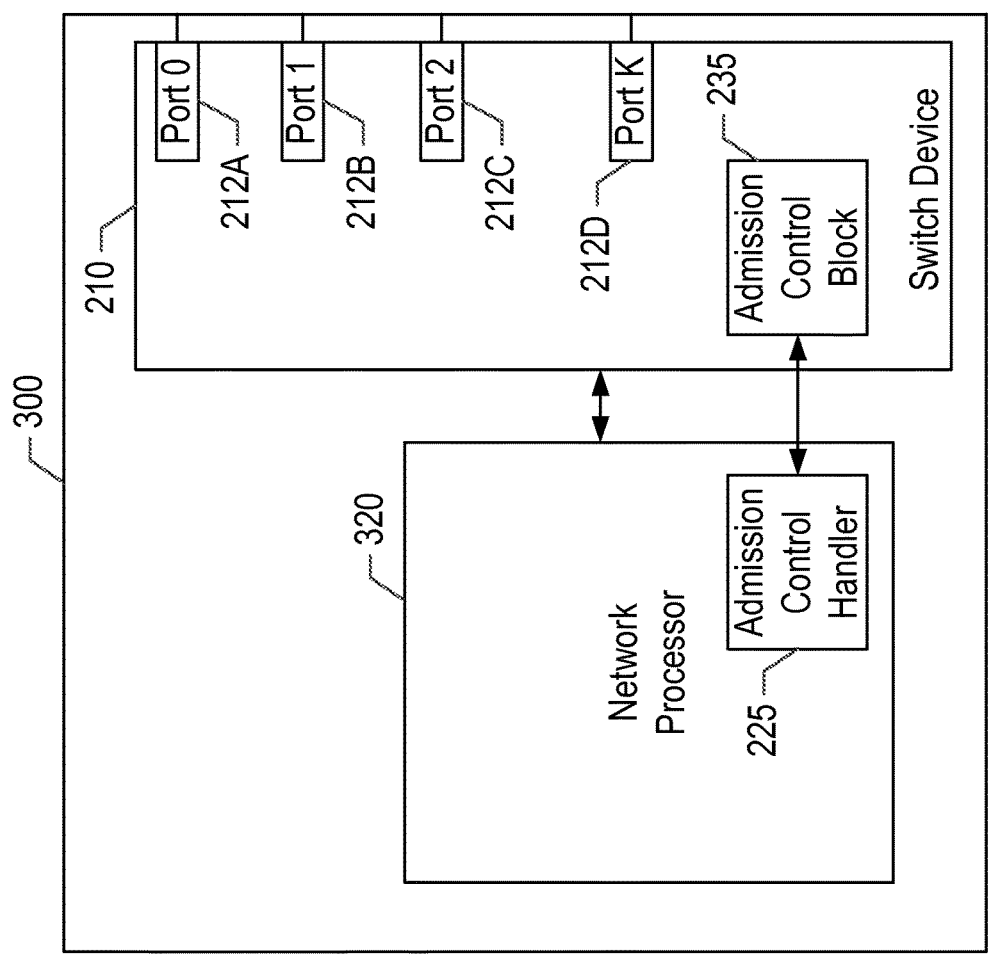
FIG. 3 illustrates an example network device implementing a system for lossless switching of traffic in accordance with one or more implementations.

FIG. 3 illustrates an example network device 300 implementing a system for lossless switching of traffic in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network device 300 includes a network processor 320 and a switch device 210. The network processor 320 may include an admission control handler 225. The switch device 210 may include ports 212A-D. The ports 212A-D may each be associated with one or more queues. The network processor 320 may handle data items, such as data flows, data contexts, etc. that may each be associated with one of the queues of the switch device 210. In operation, the switch device 210 may monitor the depths of the queues and may provide congestion information to the network processor 320, e.g. via the admission control block 235. The network processor 320 may receive the congestion information for the queues and may prevent data items associated with congested queues from being released while allowing data items associated with uncongested queues to be released, e.g. via the admission control handler 225.

Figure 4:
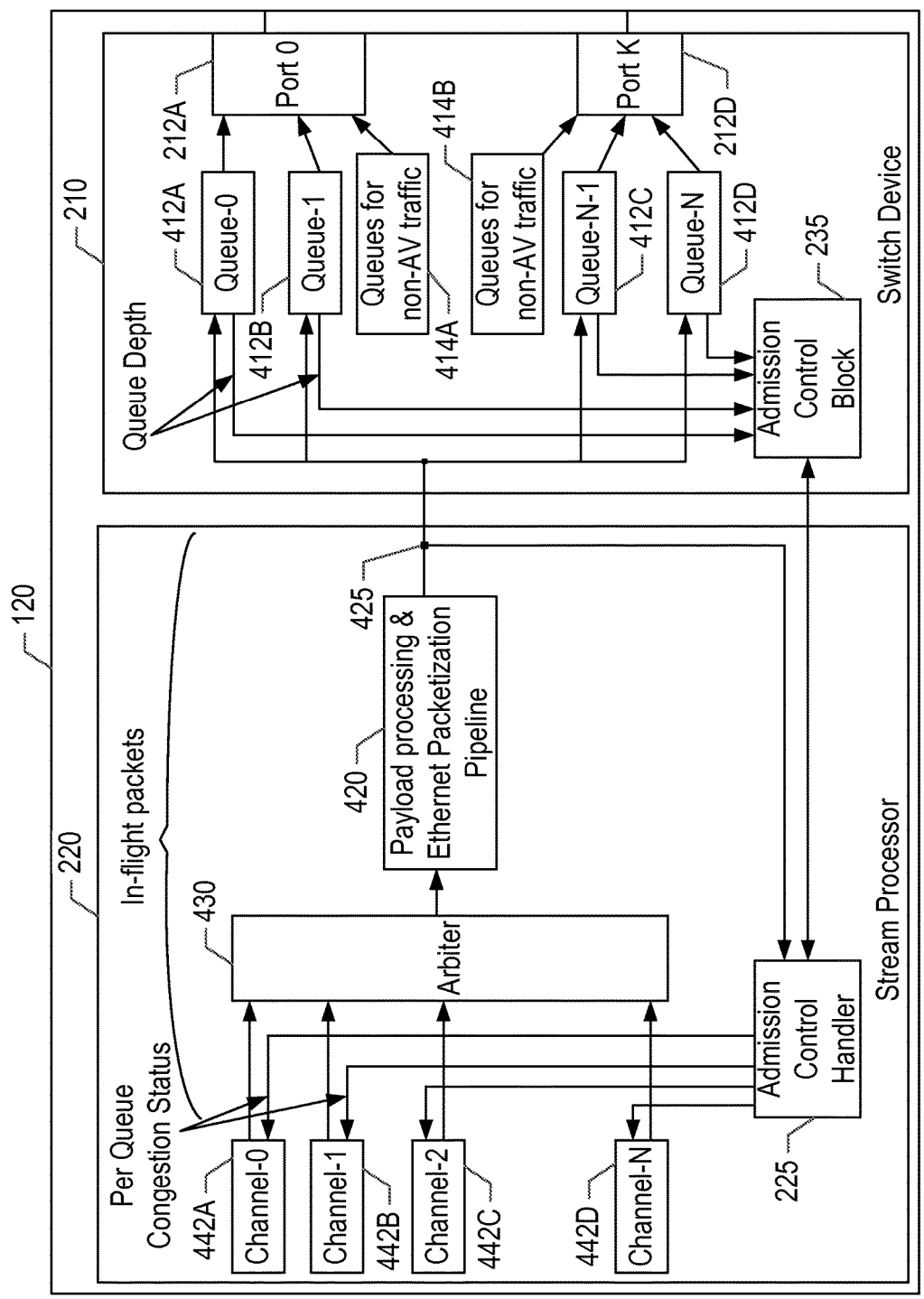
FIG. 4 illustrates an example network device including a stream processor and implementing a system for lossless switching of traffic in accordance with one or more implementations.

FIG. 4 illustrates an example network device 120 including a stream processor 220 and implementing a system for lossless switching of traffic in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network device 120 may include the stream processor 220 and the switch device 210. The stream processor 220 may include the ACH 225, a payload processing and Ethernet packetization pipeline ("packetization pipeline") 420, an arbiter 430, data channels 442A-D, and a tap 425. The switch device 210 may include the ACB 235, the ports 212A,D, queues 412A-D that are dedicated to AV traffic, e.g. packets received from the stream processor 220, and queues 414A-B that are dedicated to non-AV traffic, e.g. packets received from the host processor 230. For explanatory purposes, the ACH 225 is illustrated as part of the stream processor 220; however, in one or more implementations, the ACH 225 may be separate from, but communicably coupled to, the stream processor 220. Similarly, the ACB 235 may be separate from, but communicably coupled to, the switch device 210.

Further for explanatory purposes, the ports 212A,D are illustrated as each being associated with two queues 412A-D dedicated to AV traffic and one queue 414A-B associated with non-AV traffic; however, the ports 212A,D may each be associated with any number of queues dedicated to AV traffic and any number of queues dedicated to non-AV traffic. The switch device 210 may associate different scheduling priorities with the queues 412A-D dedicated to AV traffic and the queues 414A-B dedicated to non-AV traffic, e.g. such that the AV traffic queued in the queues 412A-D can be prioritized for scheduling over any non-AV traffic queued in the queues 414A-B, and vice-versa. In one or more implementations, the ports 212A,D may each be associated with a scheduler that schedules data from the queues 412A-D, 412A-B for transmission over the ports 212A,D. Thus, the scheduler may prioritize AV traffic queued in the queues 412A-D over non-AV traffic queued in the queues 414A-B for transmission over the ports 212A, D. In one or more implementations, the switch device 210 may include a packet buffer that stores the packets queued in the queues 412A-D and 414A-B.

In one or more implementations, the channels 442A-D may be, and/or may include, queues that are stored in DRAM, or other memory. The channels 442A-D may each be associated with separate AV streams, e.g. AV streams being prepared for transmission to separate electronic devices 102, 104, 106. The channels 442A-D may include descriptors, and/or other identifiers, of data units, such as transport stream packets, that are stored in, e.g., DRAM, and that are ready to be released to the packetization pipeline 420. The arbiter 430 may determine which of the channels 442A-D may release a data unit to the packetization pipeline 420. The packetization pipeline 420 may include, e.g., a security module for encrypting the data units, a packetizer that packetizes the data units (e.g., encapsulates the data units in a payload and adds headers to generate packets of data). After passing through the packetization pipeline 420, the stream processor 220 passes the packets to the switch device 210 for transmission to their intended destinations.

The switch device 210 may receive the packets from the stream processor 220, may store the packets, e.g. in a packet buffer, and may queue the packets in the queues 412A-D for transmission over the ports 212A,D. Similarly, the switch device 210 may receive packets from the host processor 230, may store the packets, e.g. in a packet buffer, and may queue the packets in the queues 414A-B for transmission over the ports 212A,D. The switch device 210 may then schedule the queued packets for transmission over the ports 212A,D, e.g. via schedulers that are associated with each of the ports 212A,D. If the queues 412A-D that are dedicated to AV traffic are associated with a higher priority than the queues 414A-B that are dedicated to non-AV traffic, then the packets that are queued in the queues 412A-D may be given higher priority in scheduling for transmission over the ports 212A,D than the packets that are queued in the queues 414A-B.

The ACB 235 of the switch device 210 may be communicatively coupled to the ACH 225 of the stream processor 220. Similarly, the tap 425 may be communicatively coupled to the ACH 225. The tap 425 may be configured to provide, to the ACH 225, an indication of the data units that have completed the packetization pipeline 420, and have been passed to, or are about to be passed to, the switch device 210, e.g. in-flight data units. For example, the tap 425, and/or the switch device 210, may signal to the ACH 225 when an end of packet (EOP) cell is received. The ACH 225 may provide the indications of the in-flight data units to the ACB 235.

The ACH 225 and the ACB 235 can communicate with one another to determine when data units should be released from the channels 442A-D to the packetization pipeline 420, such that the data units will not be dropped upon reaching the switch device 210 (e.g., due to congestion of the queues 412A-D). For example, the ACB 235 may monitor the queue depth, e.g. capacities, of the queues 412A-D, and may maintain a variable for each queue that is indicative of the number of packets intended for the queue that are in-flight. The ACB 235 may utilize the queue depth information, and/or the variable that is indicative of the in-flight data units, to determine whether data units associated with a particular queue should be scheduled for release from the individual channels 442A-D, and may provide an indication of the same to the ACH 225, e.g. in response to a request therefor, or as a periodic broadcast.

In one or more implementations, the channels 442A-D may each be associated with per queue congestion indicators that indicate whether data units should be scheduled for release from the channels 442A-D. For example, the indicator for a given channel 442A may be set to 1 when data units should be scheduled for release from the channel 442A, and the indicator may be set to 0 when data units should not be scheduled for release from the channel 442A. The arbiter 430 may only schedule data units for release from the channels 442A-D when the indicator associated with the channel 442A is set to 1. Thus, if the ACH 225 receives an indication from the ACB 235 that indicates that data units should not be scheduled for release from a given channel 442A, e.g. due to congestion at the corresponding queue 412A of the switch device 210, the ACH 225 sets the indicator for the given channel 442A to 0, and the arbiter 430 will ignore the channel 442A for scheduling purposes. When the ACH 225 determines that the congestion at the switch device 210 has been relieved, e.g. based on information received from the ACB 235, the ACH 225 may set the indicator for the given channel 442A back to 1, and the arbiter may begin to schedule data units for the given channel 442A. In one or more implementations, the per queue congestion indicators may be maintained by, and/or stored at, the arbiter 430, e.g. for non-congested status when multiple channels 442A-D are mapped to the same queue 412A. In one or more implementations, the arbiter 430 may not receive requests from the channels 442A-D when the associated queues 412A-D are congested.

In one or more implementations, the stream processor 220 may include a scheduler that includes the arbiter 430 and the ACH 225. For example, the ACH 225 may obtain congestion status, the arbiter 430 may arbitrate non-congested queues and may select a winning queue, and the winning queue data may be read from DRAM, or other memory, and passed to the switch device 210.

In some aspects, the ACH 225, the ACB 235, and/or the tap 425 may be implemented in software (e.g., subroutines and code). In some aspects, the ACH 225, the ACB 235, and/or the tap 425 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
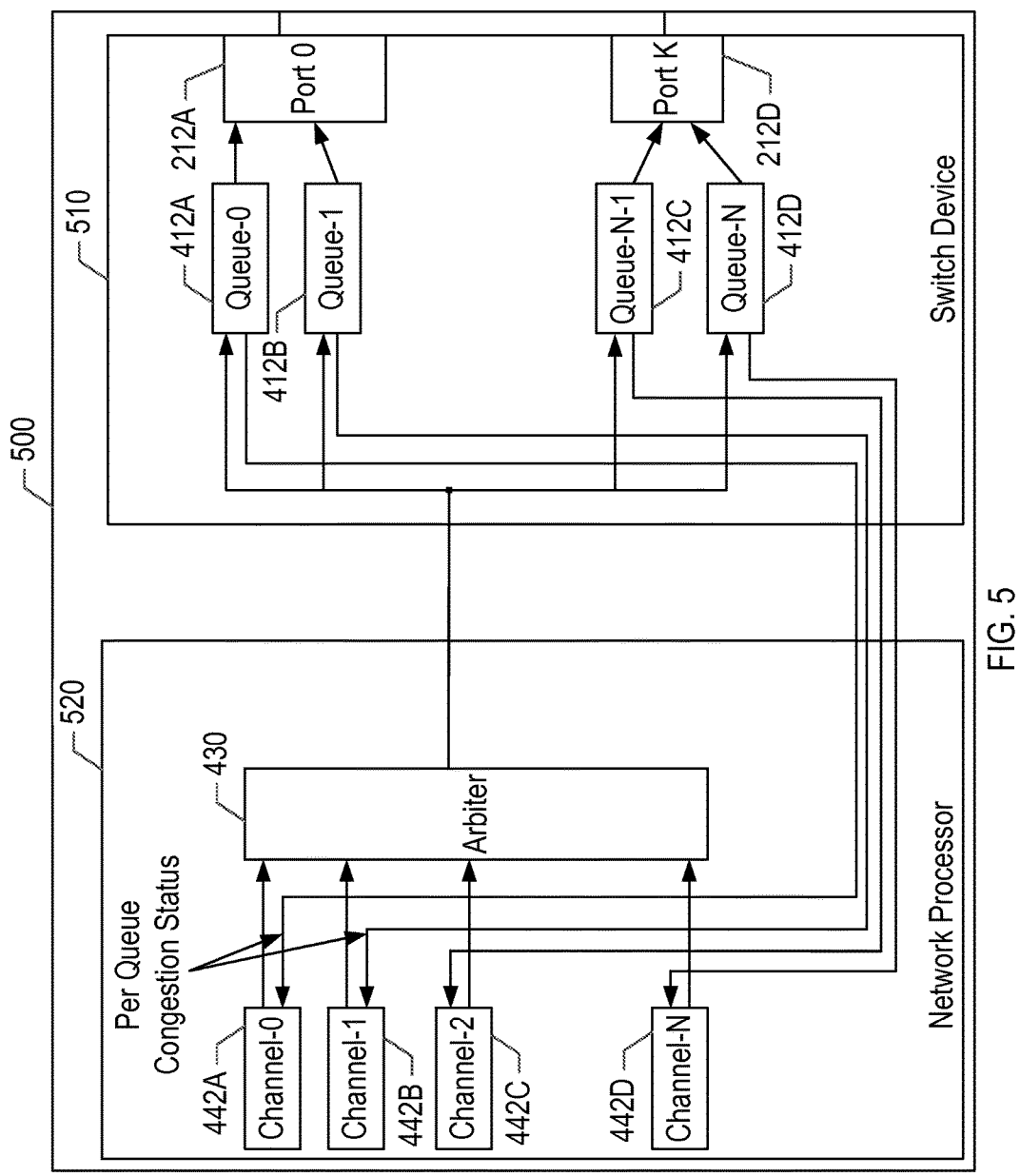
FIG. 5 illustrates an example network device implementing a system for lossless switching of traffic in accordance with one or more implementations.

FIG. 5 illustrates an example network device 500 implementing a system for lossless switching of traffic in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network device 500 includes a network processor 520 and a switch device 510. The network processor 520 includes channels 442A-D and an arbiter 430. The switch device 510 includes queues 412A-D and associated ports 212A-D. The channels 442A-D may each be associated with one of the queues 412A-D. In operation, the channels 442A-D receive congestion status from the associated queues 412A-D, e.g. via an ACH 225 and an ACB 235. The channels 442A-D may release data units to the switch device 510 when the associated queues 412A-D are not congested. If the associated queues are 412A-D, the channels 442A-D may not release data units to the switch device 510. The arbiter 430 coordinates, e.g. schedules, the release of data units from the channels 442A-D. An example operation of the example network device 500 is discussed further below with respect to FIG. 8.

Figure 6:
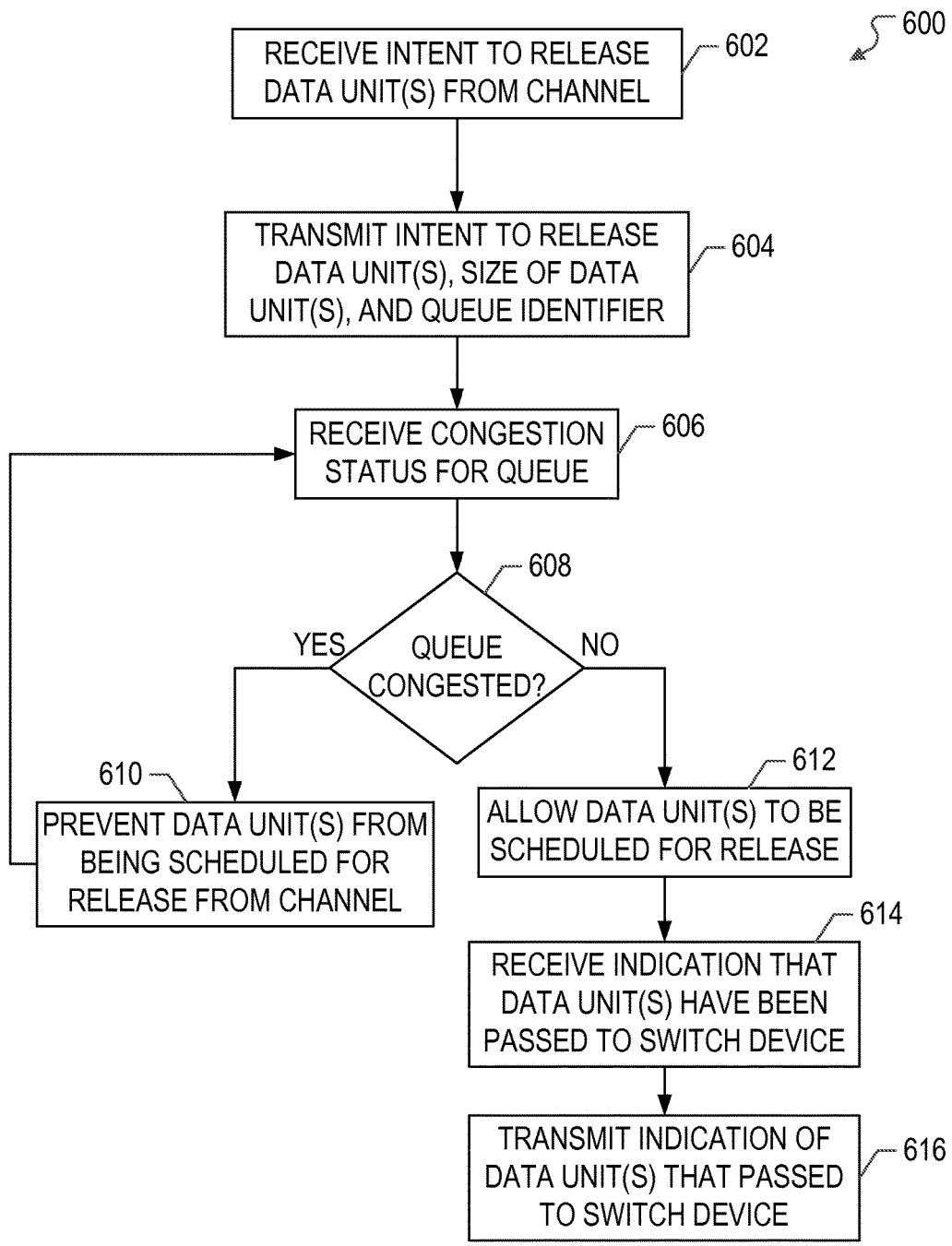
FIG. 6 illustrates a flow diagram of an example process of an example admission control handler (ACH) in an example network device implementing a system for lossless switching of traffic in accordance with one or more implementations.

FIG. 6 illustrates a flow diagram of an example process 600 of an example admission control handler (ACH) 225 in an example network device 120 implementing a system for lossless switching of traffic in accordance with one or more implementations. For explanatory purposes, the example process 600 is described herein with reference to the ACH 225 of the network device 120 of FIGS. 2 and 4; however, the example process 600 is not limited to the ACH 225 of the network device 120 of FIGS. 2 and 4, and the example process 600 may be performed by one or more other components of the network device 120. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The ACH 225 receives an intent to release, such as a request to release, one or more data units from one of the channels 442A-D, such as the channel 442A (602). For example, the channel 442A may transmit the size of a packet that is at the head of a queue associated with the channel 442A. The channel 442A may also provide an identifier of one of the queues 412A-D, such as the queue 412A, that is mapped to the channel 442A. For example, the channel 442A may be configured to store the identifier of the queue 412A that is mapped to the channel 442A, e.g. when the channel 442A is initialized. In one or more implementations, if the channel 442A does not provide an identifier of the queue 412A that is mapped to the channel 442A, the ACH 225 may access a lookup table, or other memory structure, that stores associations between the queues 412A-D that are mapped to the channels 442A-D, to determine the identifier of the queue 412A that is mapped to the channel 442A.

The ACH 225 transmits, to the ACB 235, the intent of the channel 442A to release the one or more data units, along with the size of the one or more data units and the queue identifier of the queue 412A that is mapped to the channel 442A (604). The ACH 225 receives, from the ACB 235, congestion status for the queue 412A associated with the channel 442A (606), e.g. based at least in part on the queue depth of the queue 412A and/or the number of in-flight data units released by the channel 442A or any other channel associated with the queue 412A. In one or more implementations, the ACH 225 may receive congestion status from the ACB 235 for any of the queues 412A-D, such as all of the queues 412A-D, on a periodic basis, such as each clock cycle.

If the congestion status indicates that the queue is congested (608), the ACH 225 prevents the one or more data units from being scheduled for release from the channel 442A (610), e.g. by the arbiter 430, and receives the congestion status again for the queue (606), e.g. at the next periodic interval, such as the next clock cycle. For example, the ACH 225 may set an indicator associated with the channel 442A to indicate that the channel 442A should not be considered for release by the arbiter 430, and/or the ACH 225 may transmit a signal to the arbiter 430 that indicates that the channel 442A should not be considered for release by the arbiter 430. In one or more implementations, the indicators associated with the channels 442A-D may be configured by default to indicate that the channels 442A-D should not be considered by the arbiter 430, e.g. until the ACH 225 indicates otherwise. Thus, in these one or more implementations, the ACH 225 may not need to perform any action to prevent the data units from being scheduled for release from the channel 442A, e.g. the data units may be prevented from being scheduled for release by default.

In one or more implementations, upon preventing the one or more data units from being scheduled for release by the arbiter 430, the ACH 225 may optionally transmit, to the ACB 235, a request to remove the one or more data units from the in-flight data units variable for the channel 442A, e.g. by subtracting the size of the one or more data units from the in-flight data units variable. If the ACH 225 transmits a request to remove the one or more data units, the ACH 225 may wait until the congestion is relieved at the queue before transmitting again, to the ACB 235, the intent to release the data units (604).

If the congestion status indicates that the queue 412A is not congested (608), the ACH 225 may allow the data units to be scheduled for release from the channel 442A by the arbiter 430 (612). For example, the ACH 225 may set an indicator associated with the channel 442A to indicate that the channel 442A should be considered for release by the arbiter 430, and/or the ACH 225 may transmit a signal to the arbiter 430 that indicates that the channel 442A should be considered for release by the arbiter 430. In one or more implementations, the channel 442A may indicate an intent to release data units to the ACH 225 any time the channel 442A has data units to release. The ACH 225 may check the congestion status based on the request and forward it to the arbiter 430 which may either consider the channel 442A or not (in case where congested) when arbitrating between the channels 442A-D. Thus, depending upon the arbitration discipline, the same channel 442A may be serviced multiple times in a row, assuming that it has data units to release.

After the one or more data units have been released and have passed through the tap 425 to the switch device 210, the ACH 225 receives an indication, from the tap 425, that indicates that the one or more data units have been passed to the switch device 210, or are about to pass to the switch device 210 (614). In one or more implementations, the ACH 225 may receive an indication that an end of packet (EOP) cell has passed to the switch device 210. For example, the one or more data units may be associated with an identifier, such as a packet identifier, and/or the data units may be associated with a channel identifier. The tap 425 may transmit the packet identifier of the data units and/or the channel identifier of the data units to the ACH 225, and/or the tap 425 may transmit the size of the data units to the ACH 225. The ACH 225 may then transmit an indication to the ACB 235 that indicates that the one or more data units have passed to the switch device 210 (616), and therefore should be removed from the in-flight data units variable for the queue 412A, e.g. the size of the one or more data units should be subtracted from the in-flight data units variable for the queue 412A. For example, the ACH 225 may transmit an identifier of the queue, e.g. determined based at least in part on a channel-to-queue mapping that is accessible to the ACH 225, and the size of the one or more data units.

In one or more implementations, the arbiter 430 allowing the data units to be scheduled for release from the channel 442A (612) may not be sequential with the ACH 225 receiving the indication, from the tap 425, that indicates that the one or more data units have been passed to the switch device 210 (614) and the ACH 225 transmitting the indication to the ACB 235 that indicates that the one or more data units have passed to the switch device 210 (616). For example, after the arbiter 430 allows the data units to be scheduled for release from the channel 442 (612), the ACH 225 may receive another intent to release one or more data units from one of the channels 442A-D, such as the channel 442A (602) and (604) through (612) may be repeated. The ACH 225 receiving the indication, from the tap 425, that indicates that the one or more data units have been passed to the switch device 210 (614) and the ACH 225 transmitting the indication to the ACB 235 that indicates that the one or more data units have passed to the switch device 210 (616) may occur at some later time, e.g. after (602) through (612) have occurred multiple times depending upon the system latency associated with reading the data units from DRAM and passing them to the switch device 210.

Figure 7:
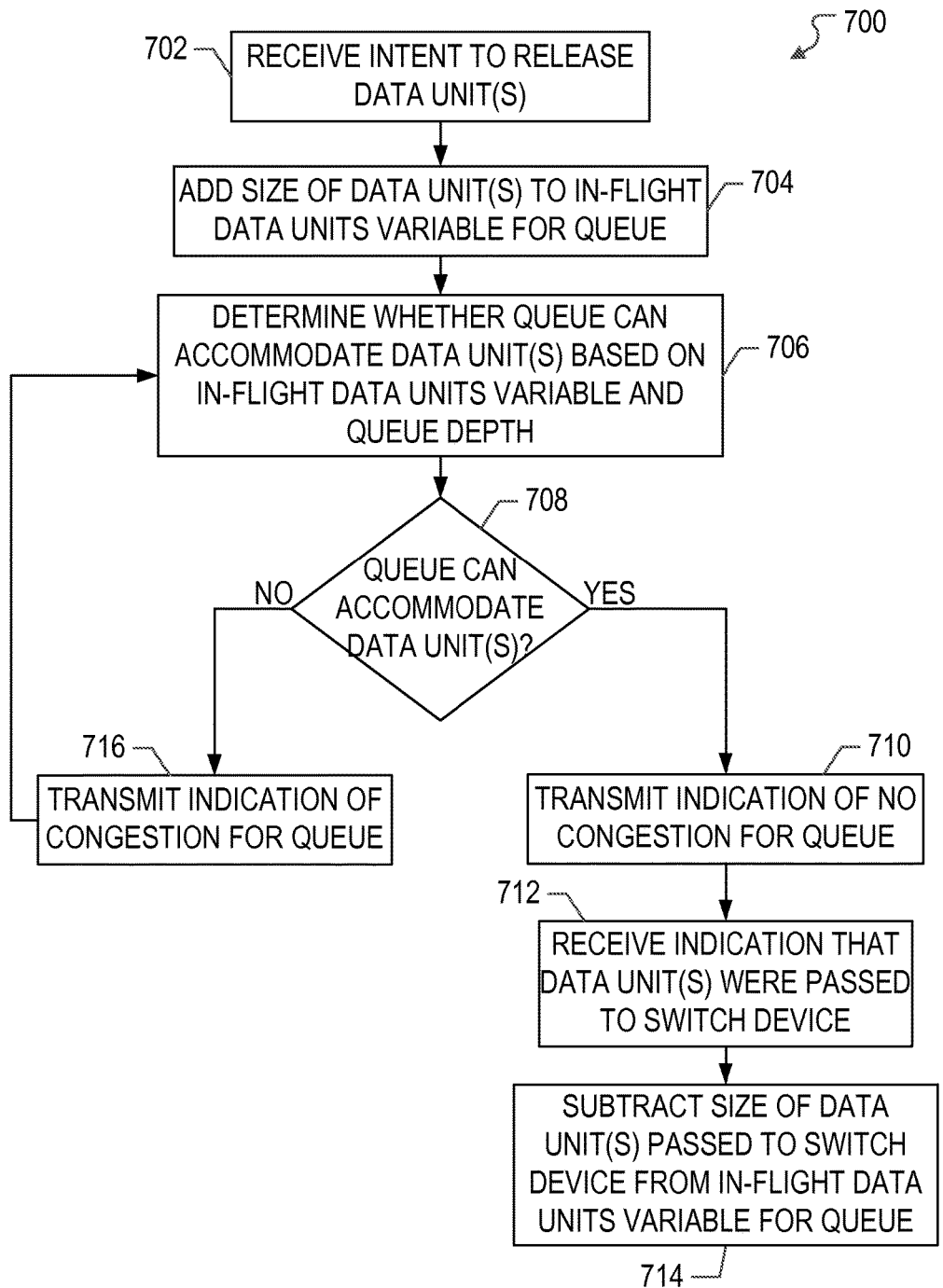
FIG. 7 illustrates a flow diagram of an example process of an example admission control block (ACB) in an example network device implementing a system for lossless switching of traffic in accordance with one or more implementations.

FIG. 7 illustrates a flow diagram of an example process 700 of an example admission control block (ACB) 235 in an example network device 120 implementing a system for lossless switching of traffic in accordance with one or more implementations. For explanatory purposes, the example process 700 is described herein with reference to the ACB 235 of the network device 120 of FIGS. 2 and 4; however, the example process 700 is not limited to the ACB 235 of the network device 120 of FIGS. 2 and 4, and the example process 700 may be performed by one or more other components of the network device 120. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

The ACB 235 may continuously monitor the queue depths of the queues 412A-D of the switch device 210 that are dedicated to AV traffic, and may continuously provide, e.g. each clock cycle, the congestion status of the queues 412A-D to the ACH 225. The ACB 235 receives, from the ACH 225, an intent to release one or more data units from one of the channels 442A-D, such as the channel 442A, through the packetization pipeline 420 to one of the queues 412A-D, such as the queue 412A (702). The message from the ACH 225 indicating the intent may include a size of the one or more data units to be released and an identifier of one of the queues 412A-D, such as the queue 412A. The ACB 235 adds the total size of the one or more data units to an in-flight data units variable associated with the identified queue 412A (704).

The ACB 235 determines whether the queue 412A can accommodate the one or more data units based at least in part on the in-flight data units variable and the queue depth (706). For example, if adding the size of the data units reflected by the in-flight data units variable to the existing queue depth of the queues 412A would cause the queue 412A to overflow, then the queue 412A cannot accommodate the one or more data units. If the queue 412A can accommodate the one or more data units (708), the ACB 235 transmits an indication of no congestion for the queue 412A (710). The ACH 225 may subsequently allow the one or more data units to be scheduled for release, and the ACB 235 may receive an indication, from the ACH 225, that indicates that the one or more data units have been passed to the switch device 210, or are about to pass to the switch device 210 (712). Upon receiving the indication from the ACH 225 that the one or more data units have been passed to the switch device 210 (712), the ACB 235 subtracts the size of the one or more data units passed to the switch device 210 from the in-flight data units variable (714).

If the queue 412A cannot accommodate the one or more data units (708), the ACB 235 transmits, to the ACH 225, an indication of congestion for the queue 412A (716). The ACB 235 may then monitor the congestion and determine again, e.g. at the next clock cycle, whether the queue 412A can accommodate the one or more data units (706). In one or more implementations, the ACB 235 may receive a request to remove the size of the one or more data units (that cannot be accommodated at the queue 412A) from the in-flight data units variable, and the ACB 235 may remove the size of the one or more data units from the in-flight data units variable in response thereto, e.g. by subtracting the size of the one or more in-flight data units from the in-flight data units variable.

Figure 8:
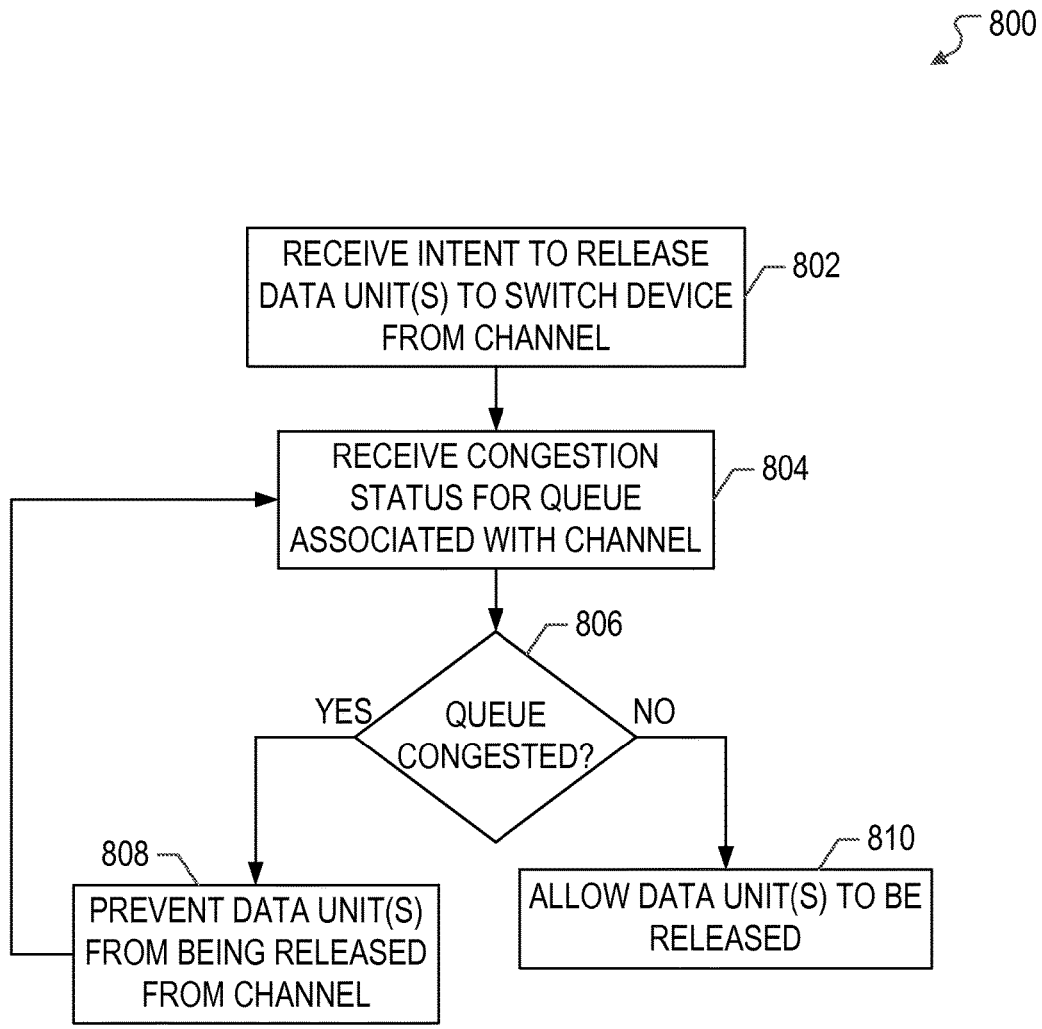
FIG. 8 illustrates a flow diagram of an example process of a system for lossless switching of traffic in a network device in accordance with one or more implementations.

FIG. 8 illustrates a flow diagram of an example process 800 of a system for lossless switching of traffic in accordance with one or more implementations. For explanatory purposes, the example process 800 is described herein with reference to the network processor 520 and the switch device 510 of the network device 500 of FIG. 5; however, the example process 800 is not limited to the network processor 520 and/or the switch device 510 of the network device 500 of FIG. 5, and the example process 800 may be performed by one or more other components of the network device 500. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The network processor 520 receives an intent to release one or more data units, e.g. packets, to the switch device 510 from one of the channels 442A-D, such as the channel 442A (802). The network processor 520 may receive congestion status, e.g. every clock cycle, for one or more of the queues 412A-D, such as the queue 412A that is associated with the channel 442A (804). The network processor 520 determines, based at least on the congestion status for the queue 412A, whether the queue 412A is congested (806).

If the network processor 520 determines that the queue 412A is congested (806) or otherwise cannot accommodate the one or more data units, the network processor 520 prevents the one or more data units from being released from the channel 442A to the switch device 510 (808). For example, the network processor 520 may prevent the channel 442A from scheduling the data units for release to the switch device 510. The network processor 520 may then receive the congestion status again for the queue 412A associated with the channel 442A (804), e.g. at the next clock cycle, and determine whether the queue 412A is still congested and/or whether the queue 412A can accommodate the one or more data units (806).

If the network processor 520 determines that the queue 412A is not congested (806), the network processor 520 allows data units to be released to the switch device 510 (810), such as by allowing the one or more data units to be scheduled for release from the channel 442A to the switch device 510. In one or more implementations, if the network processor 520 determines that the queue 412A is not congested, the network processor 520 may further determine whether the queue 412A can accommodate the one or more data units before allowing the one or more data units to be released to the switch device 510.

Figure 9:
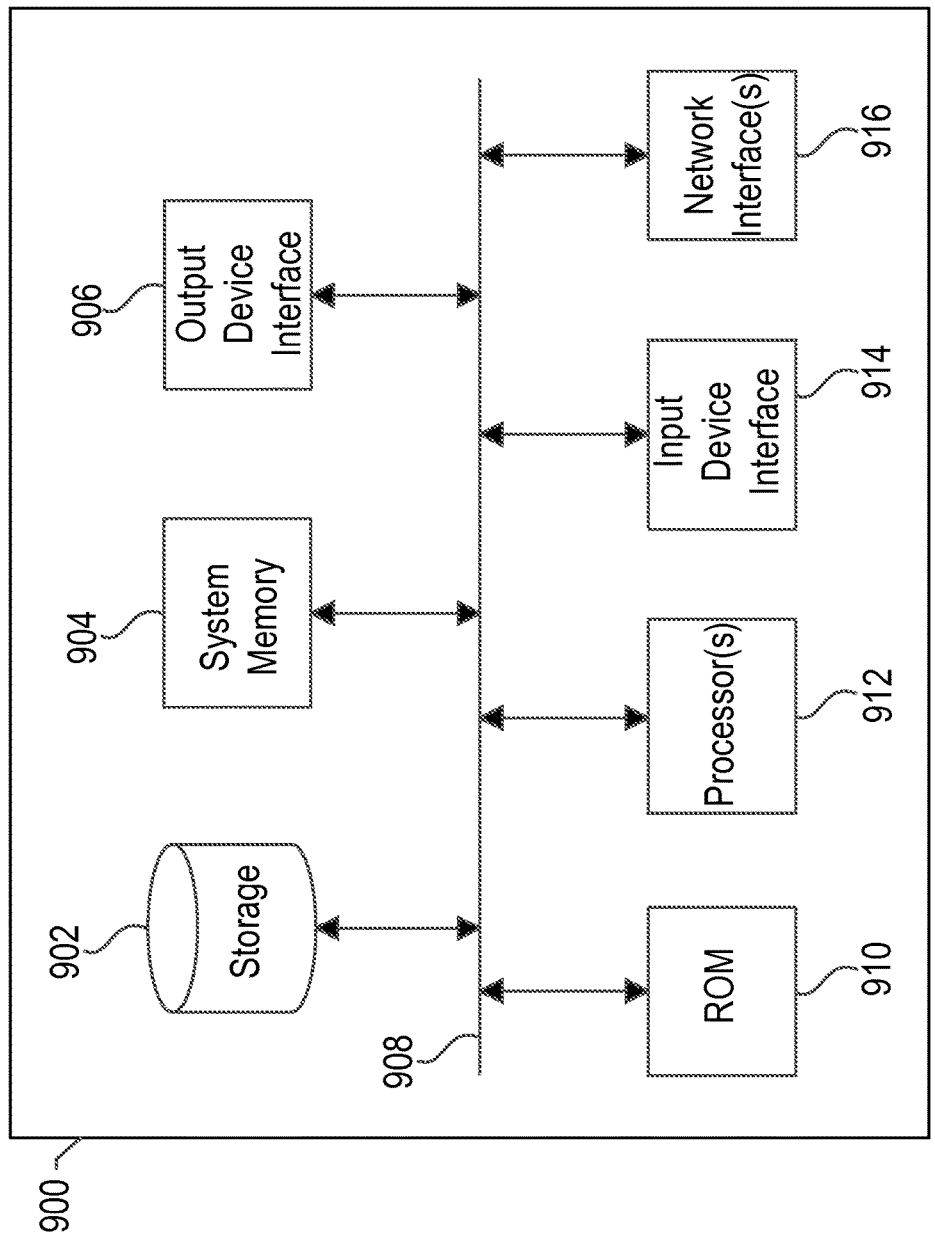
FIG. 9 conceptually illustrates an electronic system with which one or more implementations of the subject technology may be implemented.

FIG. 9 conceptually illustrates an electronic system 900 with which one or more implementations of the subject technology may be implemented. The electronic system 900, for example, can be a network device, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 900 can be, and/or can be a part of, the network device 120, and/or one or more of the electronic devices 102, 104, 106. Such an electronic system includes various types of computer readable media and interfaces for various other types of computer readable media. The electronic system 900 includes a bus 908, one or more processor(s) 912, such as the stream processor 220 and/or the host processor 230, a system memory 904 or buffer, a read-only memory (ROM) 910, a permanent storage device 902, an input device interface 914, an output device interface 906, and one or more network interface(s) 916, or subsets and variations thereof.

The bus 908 collectively represents all system, peripheral, and chipset buses that communicatively connect the numerous internal devices of the electronic system 900. In one or more implementations, the bus 908 communicatively connects the one or more processor(s) 912 with the ROM 910, the system memory 904, and the permanent storage device 902. From these various memory units, the one or more processor(s) 912 retrieve instructions to execute and data to process in order to execute the processes of the subject disclosure. The one or more processor(s) 912 can be a single processor or a multi-core processor in different implementations.

The ROM 910 stores static data and instructions that are needed by the one or more processor(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processor(s) 912 may need at runtime. In one or more implementations, the processes of the subject disclosure are stored in the system memory 904, the permanent storage device 902, and/or the ROM 910. From these various memory units, the one or more processor(s) 912 retrieve instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 9, bus 908 also couples electronic system 900 to one or more networks (not shown), one or more electronic devices 102, 104, 106, and/or content server 112, through one or more network interface(s) 916. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 900 can be a part of one or more networks of computers (such as a local area network ("LAN"), a wide area network ("WAN"), or an Intranet, or a network of networks, such as the Internet. Any or all components of electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:
1. A system comprising:
a network switch device comprising queues;
a data source comprising data items, each of the data items being associated with one of the queues;
a packetizer circuit between the data source and the network switch device, wherein the packetizer circuit is configured to packetize a data item received from the data source and pass the packetized data item to the network switch device; and a processor that is communicably coupled to the data source and the network switch device, and that is configured to:
   receive, from the network switch device, queue depth information for each of the queues of the network switch device; and
   release at least one of the data items from the data source to the network switch device via the packetizer circuit when a sum of a variable that is indicative of a size of any other data items associated with the associated queue that are in-transit from the data source to the network switch device added to a queue depth of the associated queue determined from the queue depth information, indicates that the associated queue will have space to accommodate the at least one of the data items, irrespective of the queue depth information for the other queues.

2. The system of claim 1, wherein the processor is configured to release the at least one of the data items to the network switch device when the queue depth information indicates that the associated queue will have space to accommodate the at least one of the data items and the queue depth information indicates that at least one of the other queues will not have space to accommodate the at least one of the data items.

3. The system of claim 1, wherein the processor comprises a first module and the network switch device comprises a second module, the first module being configured to:
   receive an indication of an intent to release the at least one of the data items to the network switch device, wherein the indication comprises a size of the at least one of the data items;
   transmit the size of the one of the data items and an identifier of the associated queue to the second module of the network switch device;
   receive the queue depth information for each of the queues of the network switch device from the second module of the network switch device, wherein the queue depth information is indicative of whether each of the queues can accommodate the at least one of the data items; and
   determine whether to allow the at least one of the data items to be released to the network switch device based at least on the sum of the variable that is indicative of the size of any other data items associated with the associated queue that are in-transit from the data source to the network switch device, the queue depth of the associated queue, and the size of the one of the data items.

4. The system of claim 3, wherein each of the data items is associated with one of a plurality of channels, each of the plurality of channels is associated with one of the queues of the network switch device.

5. The system of claim 4, wherein each of the plurality of channels is associated with an indicator that indicates whether the data items associated with each of the plurality of channels should be released, and the system further comprising:
   an arbiter that arbitrates the release of the data items for each of the plurality of channels, wherein the arbiter determines whether to consider each of the plurality of channels for release based at least in part on the indicator associated with each of the plurality of channels.

6. The system of claim 3, further comprising:
   a packetization pipeline communicably coupled to the data source and the network switch device, wherein the packetization pipeline comprises the packetizer circuit and at least one of the data items is released from the data source to the packetization pipeline and is passed from the packetization pipeline to the network switch device.

7. The system of claim 6, further comprising:
   a tap that is located between an end of the packetization pipeline and the network switch device, wherein the tap is configured to transmit an indication of the at least one of the data items to the first module when the at least one of the data items passes through the tap.

8. The system of claim 7, wherein the first module is further configured to transmit the indication of the at least one of the data items to the second module of the network switch device upon receiving the indication of the at least one of the data items from the tap.

9. The system of claim 3, wherein the data items comprise packets, the first module and the second module are on a single semiconductor chip, the first module is communicably coupled to the second module via a transmission line on the semiconductor chip, and the data source is stored on a memory module that is external to the semiconductor chip.

10. The system of claim 1, wherein the processor is further configured to:
   receive an indication of intent to release a packet from the data source, the indication comprising a packet size and an identifier of one of the queues of the network switch device;
   determine whether space is available for the packet in a portion of a buffer that is allocated to the one of the queues of the network switch device based at least in part on the sum of the packet size, the queue depth of the one of the queues, and the variable that is indicative of the size of any other data items associated with the one of the queues that are in-transit from the data source to the network switch device; and
   allow the packet to be scheduled for release from the data source when the space is available for the packet; and
   prevent the packet from being scheduled for release from the data source when the space is not available for the packet.

11. The system of claim 10, wherein the processor is further configured to:
   add the packet size to the variable that is indicative of the size of any other data items associated with the one of the queues are in-transit from the data source to the network switch device when the packet is released; and
   remove the packet size from the variable upon receiving an indication that the packet is received at the network switch device.

12. The system of claim 10, wherein the processor is configured to:
   determine a current space available in the portion of the buffer that is allocated to the one of the queues based at least in part on the queue depth;
   determine an amount of the current space available that is required to store the other data items associated with the one of the queues that are in-transit from the data source to the network switch device based at least in part on the sum of the variable that is indicative of the size of any other data items associated with the queue that are in-transit from the data source to the network switch device; and
   determine whether the space is available for the packet based at least in part on whether the packet size is less than or equal to a remaining amount of the current space available after accounting for the amount of the current space available required to store any other data items associated with the one of the queues that are in-transit from the data source to the network switch device.

13. A device comprising:
at least one processor configured to:
   receive queue depth information for each of a plurality of queues of a network device;
   maintain a respective in-flight variable for each respective queue of the plurality of queues, each respective in-flight variable indicating a number of data items associated with each respective queue that have been released from a data source but have not yet been queued in the respective queue; and
   release at least one of a plurality of data items stored at the data source to the network device when a sum of a queue depth determined from the queue depth information for one of the plurality of queues that is associated with the at least one of the plurality of data items added to a size of the number of data items indicated by the inflight variable for the one of the plurality of queues indicates that the one of the plurality of queues will have space to accommodate the at least one of the plurality of data items, irrespective of the queue depth information for other queues of the plurality of queues.

14. A method comprising:
receiving queue depth information for each of a plurality of queues of a network device; and
releasing at least one of a plurality of data items stored at a data source to the network device when a sum of a variable that indicates a size of any other data items that have been released from the data source but not yet queued at the network device at one of the plurality of queues that is associated with the at least one of the plurality of data items added to a queue depth determined from the queue depth information for the one of the plurality of queues indicates that the one of the plurality of queues will have space to accommodate the at least one of the plurality of data items, irrespective of the queue depth information for other queues of the plurality of queues.

15. The system of claim 1, wherein the processor is further configured to:
   adjust the variable based at least in part on the at least one of the data items when the at least one of the data items is released; and
   adjust the variable based at least in part on the at least one of the data items upon receipt of an indication that the at least one of the data items has been received by the network switch device.

16. The system of claim 15, wherein the processor is configured to:
   increase the variable based at least in part on a size of the at least one of the data items when the at least one of the data items is released; and
   decrease the variable based at least in part on the size of at least one of the data items upon receipt of the indication that the at least one of the data items has been received by the network switch device.

17. The device of claim 13, wherein the at least one processor is further configured to:
   increase the respective in-flight variable when the at least one of the plurality of data items is released; and
   decrease the respective in-flight variable upon receipt of an indication that the at least one of the plurality of data items has been queued in the one of the plurality of queues.

18. The method of claim 14, further comprising:
adjusting the inflight-variable when the at least one of the plurality of data items is released.

19. The method of claim 18, further comprising:
receiving, from the network device, an indication that the at least one of the plurality of data items has been queued at the network device; and
responsive to receiving the indication, adjusting the inflight-variable.

20. The method of claim 19, wherein adjusting the inflight-variable when the at least one of the plurality of data items is released comprises incrementing the inflight-variable based at least in part on a size of the at least one of the plurality of data items when the at least one of the plurality of data items is released.

* * * * *